United States Patent
Faye et al.

(10) Patent No.: US 12,540,872 B2
(45) Date of Patent: Feb. 3, 2026

(54) SYSTEM FOR SENSING TORQUE

(71) Applicants: TE Connectivity Solutions GmbH, Schaffhausen (CH); TE Connectivity Sensors France, Toulouse (FR)

(72) Inventors: Papa Aldemba Faye, Toulouse (FR); Arthur Vignolles, Toulouse (FR); Predrag Drljaca, Muhlenstrasse (CH)

(73) Assignees: TE Connectivity Solutions GmbH, Schaffhausen (CH); TE Connectivity Sensors France, Toulouse (FR)

( * ) Notice: Subject to any disclaimer, the term of this patent is extended or adjusted under 35 U.S.C. 154(b) by 303 days.

(21) Appl. No.: 18/168,668

(22) Filed: Feb. 14, 2023

(65) Prior Publication Data
US 2023/0258517 A1   Aug. 17, 2023

(30) Foreign Application Priority Data
Feb. 14, 2022 (EP) .................................... 22305160

(51) Int. Cl.
*G01L 3/10*   (2006.01)
*B25J 13/08*  (2006.01)
*B25J 17/00*  (2006.01)

(52) U.S. Cl.
CPC ............. *G01L 3/108* (2013.01); *B25J 13/085* (2013.01); *B25J 17/00* (2013.01)

(58) Field of Classification Search
CPC ..... G01L 3/108; G01L 5/0042; G01L 5/1627; G01L 1/2231; G01L 3/1457; B25J 13/085; B25J 17/00; B25J 11/00
See application file for complete search history.

(56) References Cited

U.S. PATENT DOCUMENTS

| | | | | |
|---|---|---|---|---|
| 9,003,896 | B2* | 4/2015 | Nold | G01L 3/1457 |
| | | | | 73/862.321 |
| 10,195,739 | B2* | 2/2019 | Hares | B25J 9/1692 |
| 10,739,216 | B2* | 8/2020 | Haehnle | G01L 3/1457 |
| 11,105,694 | B2* | 8/2021 | Haehnle | G01L 3/1421 |
| 11,105,695 | B2* | 8/2021 | Haehnle | G01L 3/1457 |
| 11,499,879 | B2* | 11/2022 | Endo | B25J 19/02 |

(Continued)

FOREIGN PATENT DOCUMENTS

| | | | | |
|---|---|---|---|---|
| DE | 278644 A1 * | 5/1990 | | |
| EP | 1074826 A2 * | 2/2001 | ........... | G01L 3/1457 |

(Continued)

OTHER PUBLICATIONS

Extended European Search Report, Application No. 22305160.8-1001, Dated: Aug. 1, 2022, 8 pages.

(Continued)

*Primary Examiner* — Octavia Hollington
(74) *Attorney, Agent, or Firm* — Barley Snyder

(57) ABSTRACT

A system for sensing torque of an object includes a flange having a first length along a main axis of a main surface of the flange and a torque sensor device formed over the main surface of the flange. The torque sensor device includes a sensing portion and a plurality of measurement transducers formed over the sensing portion. The torque sensor device has a second length parallel to the main surface of the flange and a third length parallel to the main surface of the flange. The second length and the third length are each smaller than half of the first length.

23 Claims, 5 Drawing Sheets

(56) References Cited

U.S. PATENT DOCUMENTS

| | | | |
|---|---|---|---|
| 11,781,928 B2 * | 10/2023 | Takada | G01L 3/1457 |
| | | | 73/862.338 |
| 12,000,745 B2 * | 6/2024 | Vignolles | B25J 13/085 |
| 2020/0348194 A1 | 11/2020 | Endo | |
| 2021/0325267 A1 | 10/2021 | Vignolles et al. | |
| 2023/0106198 A1 * | 4/2023 | Faye | G01L 3/108 |
| | | | 73/862.338 |

FOREIGN PATENT DOCUMENTS

| | | | | |
|---|---|---|---|---|
| EP | 1353159 A2 * | 10/2003 | | G01L 3/1457 |
| EP | 2322905 A1 * | 5/2011 | | B29C 45/76 |
| EP | 3896416 A1 | 10/2021 | | |
| JP | 2003246201 A | 9/2003 | | |
| JP | 2021170003 A | 10/2021 | | |
| JP | 2022010110 A | 1/2022 | | |
| WO | 2010066296 A1 | 6/2010 | | |
| WO | 2018041948 A1 | 3/2018 | | |

OTHER PUBLICATIONS

Japanese Office Action dated Feb. 20, 2024 with English translation, corresponding to Application No. 2023-018068, 16 pages.

\* cited by examiner

SYSTEM FOR SENSING TORQUE

CROSS-REFERENCE TO RELATED APPLICATIONS

This application claims the benefit of the filing date under 35 U.S.C. § 119(a)-(d) of European Patent Application No. 22305160.8, filed on Feb. 14, 2022.

FIELD OF THE INVENTION

The invention relates to a system for sensing torque, in particular, a system for sensing torque comprising at least one torque sensor device attached to a flange, for example, to a flange that does not comprise stainless steel. The system is configured for sensing a torque of some object, for example, a driven shaft or a robot joint.

BACKGROUND

Accurately detecting the torque of an object, for example, some driven shaft or joint, represents a problem that is of relevance in a plurality of applications. A particular application relates to torque measurement during the movement of joints of robots. In a joint of a robot on which loads in various directions act, in order to accurately detect a torque in the rotation direction acting on the joint, usually some cancellation mechanism must be provided in order to exclude loads in directions other than the rotation direction from the measurement process. However, reliable exclusion of such loads is very difficult.

In the art it is known to compensate for loads in directions other than the rotation direction by Wheatstone bridge circuitries and torque sensors comprising radially elastic torque transfer portions (see, for example, WO 2018/041948 A1).

Recently, a torque sensor device that allows for reliable accurate torque measurements and that can be formed in a compact light-weighted configuration that, in particular, allows for some manufacturing tolerance with respect to the positioning of the measurement transducers has been provided (EP 3 896 416). FIGS. 1A and B illustrate an example of such a torque sensor device 100.

The torque sensor device 100 comprises an inner portion 10 and an outer portion 20. An intermediate portion 30 continuously extends radially from the inner portion 10 to the outer portion 20. The inner portion 10, the outer portion 20 and the intermediate portion 30 form a circular body/diaphragm, for example, a monolithic circular body.

The intermediate portion 30 may comprise sub-portions 30a and 30b that might be separated from each other by a separator 30c. The separator 30c may be a rim or it may be a circumferential groove 30c as illustrated in FIG. 1B. Such a circumferential groove 30c may serve to orientate/direct the applied stress and strain with respect to the positions of measurement transducers.

A plurality of pairwise measurement transducers 40 is formed over or on the intermediate portion 30, for example sub-portion 30a, as it is shown in the top view of the main surface of the torque sensor device 100 of FIG. 1A. The measurement transducers 40 are arranged symmetrically about an axis running through the center of the circular body perpendicular to the main surface (axial axis). The measurement transducers 40 can, in principle, be strain-sensitive transducers, in particular, strain gages.

Moreover, in the inner portion 10, inner force application openings 11 and 12 of different sizes are formed and in the outer portion 20 outer force application openings 21 and 22 of different sizes are formed. The inner and outer force application openings 11, 12, 21 and 22 may be bores extending in an axial direction.

A torque sensor device like the torque sensor device 100 shown in FIGS. 1A and 1B provides for accurate torque measurements. However, the overall configuration is relatively complex and expensive, in particular, since the circular body/diaphragm is made of stainless steel which has a high material price.

There is a need for a system for sensing torque of an object that is relatively easily to manufacture at relatively low prices.

SUMMARY

A system for sensing torque of an object includes a flange having a first length along a main axis of a main surface of the flange and a torque sensor device formed over the main surface of the flange. The torque sensor device includes a sensing portion and a plurality of measurement transducers formed over the sensing portion. The torque sensor device has a second length parallel to the main surface of the flange and a third length parallel to the main surface of the flange. The second length and the third length are each smaller than half of the first length.

BRIEF DESCRIPTION OF THE DRAWINGS

The invention will now be described by way of example with reference to the accompanying Figures, of which.

DETAILED DESCRIPTION OF THE EMBODIMENT(S)

Features and exemplary embodiments as well as advantages of the present disclosure will be explained in detail with respect to the drawings. It is understood that the present disclosure should not be construed as being limited by the description of the following embodiments. It should furthermore be understood that some or all of the features described in the following may also be combined in alternative ways.

The present invention provides for a system comprising at least one torque sensor device formed over or on a flange. The system allows for reliably measuring the torque of an object, for example, a rotating shaft or a robot joint wherein the measurement is not significantly affected by axial or radial loads or tilting moments and, nevertheless, the manufacturing process of the system can be performed relatively easily and at relatively low costs. Torque control based on torque measurements achieved by the at least one torque sensor device of the system can be implemented in robots, for example, collaborative robots, to facilitate robot-human interactions.

Figure 1A:
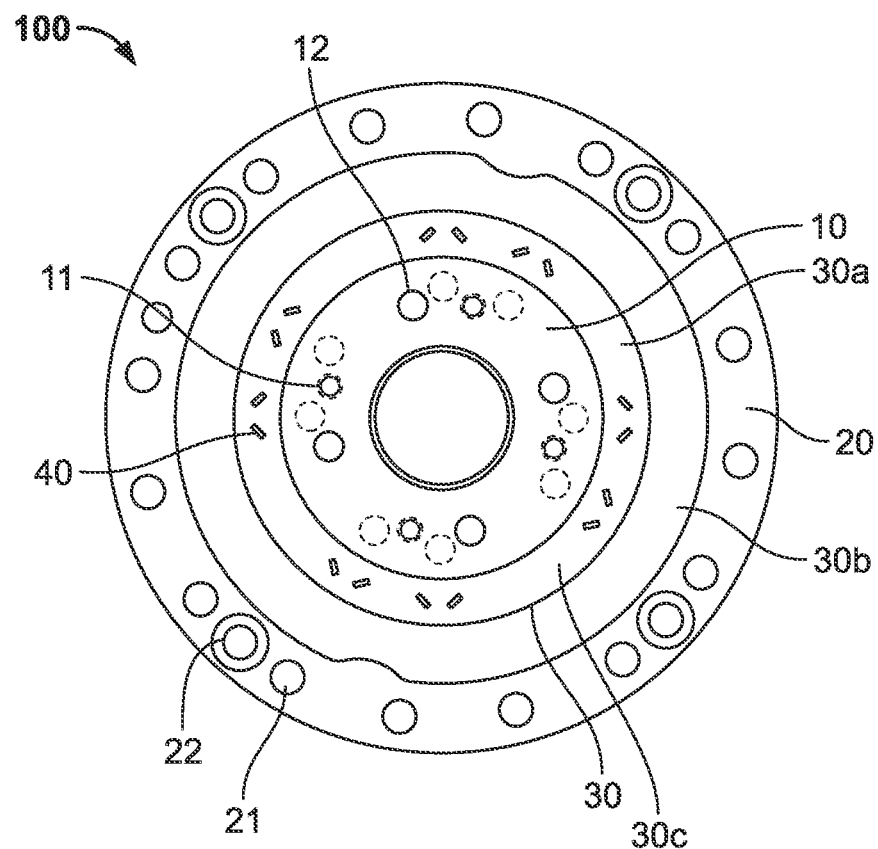
FIG. 1A is a plan view of a torque sensor device according to the prior art.
Figure 1B:
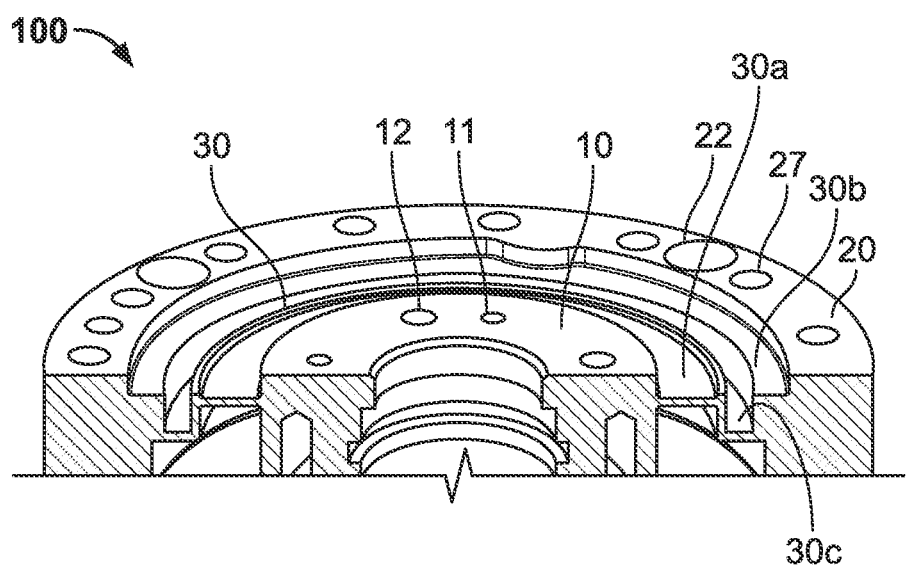
FIG. 1B is a sectional perspective view of the torque sensor device of FIG. 1A.
Figure 2:
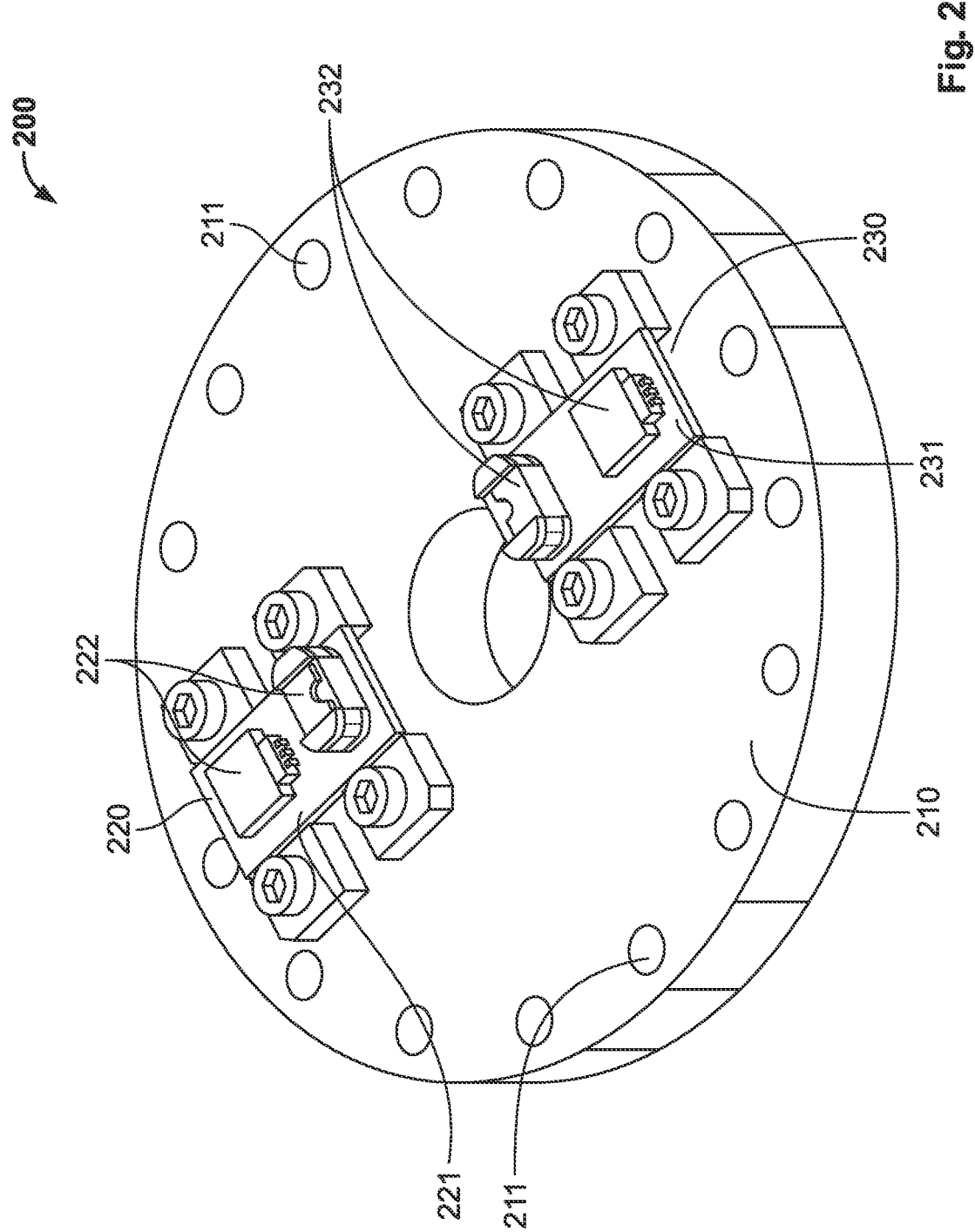
FIG. 2 is a perspective view of a system for sensing a torque of an object according to an embodiment of the present invention.

FIG. 2 shows a system 200 for sensing torque of an object according to an embodiment of the present invention. The system 200 comprises a pair of relatively tiny torque sensor devices 220 and 230 that are formed over or on a main surface of a circular shaped flange 210.

The flange 210 may not comprise stainless steel, which is a relatively expensive material, and it may be advantageous in terms of the overall costs that there is no need for making the relatively large flange component 210 of the system 200 of stainless steel. Expensive materials, as stainless steel, may be used for manufacturing the sensing portion of the at least one torque sensor device but the (relatively large as compared to the torque sensor device) flange 210 can be made without stainless steel. For example, the flange 210 may be made of or comprise an isotropic material, such as aluminum or an aluminum alloy. As compared to stainless steel, aluminum is a relatively cheap material that, nevertheless, provides a sufficiently high stiffness (for example, against tilting moments that otherwise would negatively affect accuracy of torque measurements). Thereby, overall costs can be reduced.

Moreover, the one or more torque sensor devices 220, 230 can be manufactured separately from the flange 210 and the flange can, in an embodiment, be designed separately in accordance with actual applications, particularly, with respect to attachment to and sealing of the object the torque of which is it be measured.

The flange 210 may, for example, have a diameter of 40 mm to 110 mm, 50 mm to 100 mm, or 60 mm to 90 mm. The system 200 may be configured for sensing torque in the range of 20 Nm to 200 Nm, 30 Nm to 190 Nm, or 40 Nm to 180 Nm.

The flange 210 has a first length along a main axis of a main surface of the flange 210. When the main surface of the flange 210 exhibits a rotational symmetry, the first length is the only length (in each direction). When the main surface of the flange 210 does not exhibit a rotational symmetry the first length is the longest length of the flange in a direction parallel to the main surface.

Each of the relatively tiny torque sensor devices 220 and 230 has a second length parallel to the main surface of the flange 210 in a length direction of the respective torque sensor device and a third length parallel to the main surface of the flange 210 in a width direction of the torque sensor device. Both the second length in the length direction and the third length in the width direction are smaller than half of the diameter of the flange 210, for example, smaller than ⅓ or ¼ of the diameter of the flange 210.

The flange 210 is configured to receive torque to be measured by the torque sensor devices 220 and 230 and can be connected, for example, to a rotating shaft and a static member. Outer force application openings 211 shown in FIG. 2, possibly of different sizes, are formed in the flange 210 and supplemented by inner force application openings, also possibly of different sizes. The outer force application openings 211 and the inner force application openings may be bores extending in an axial direction. The bores may have any suitable geometrical shape, for example, a circular or polygonal shape cross-section.

Torque to be measured by the torque sensor devices 220 and 230 can be transferred, for example, by a rotating shaft under consideration and some static member, via connection members connected to the inner force application openings and outer force application openings 211. Thereby, the torque applied between inner and outer portions of the flange 210 can be measured. In an embodiment, the flange 210 can be connected to a gear box and it can be configured to be connected to and sealing a gear box of a robot joint, as described in greater detail below.

The torque sensor device 220 comprises a printed circuit board 221 including some circuitry 222 configured for signal conditioning, for example, for analogue-to-digital conversion of voltage output signals supplied by circuitry devices covered by the printed circuit board 221. Signal conditioning may also include amplification of voltage output signals supplied by the circuitry devices covered by the printed circuit board 221. The printed circuit board 221 may be made of or comprise ceramic, glass, or any other material carrying electronic components and connectors. The printed circuit board 221 may be arranged above the (for example, Wheatstone) bridge circuitry.

The circuitry devices covered by the printed circuit board 221 are connected to measurement transducers of the torque sensor device 220. In an embodiment, the circuitry devices may comprise Wheatstone bridge elements (resistors) for converting an applied torque to voltage output signals. Depending on actual applications, half or full Wheatstone bridges may be used for the torque sensor device 220. The measurement transducers may comprise or consist of at least one of silicon gages, foil strain gages, and thin layer strain gages. The measurement transducers may, alternatively, be configured for sensing torque based on other measurement methods as, for example, magnetic or optical measurement methods.

Similarly, the torque sensor device 230 comprises a printed circuit board 231 including some circuitry 232 configured for signal conditioning, for example, for analogue-to-digital conversion of voltage output signals supplied by circuitry devices covered by the printed circuit board 231. Signal conditioning may also include amplification of voltage output signals supplied by the circuitry devices covered by the printed circuit board 231. The circuitry devices covered by the printed circuit board 231 are connected to measurement transducers of the torque sensor device 230. In an embodiment, the circuitry devices may comprise Wheatstone bridge elements (resistors) for converting an applied torque to voltage output signals. Depending on actual applications half or full Wheatstone bridges may be used for the torque sensor device 230.

According to an embodiment, at least one pair of torque sensor devices 220, 230 is comprised by the system wherein one torque sensor device of the at least one pair of torque sensor devices comprises a half of a Wheatstone bridge circuitry and the other torque sensor device of the at least one pair of torque sensor devices comprises another half of the Wheatstone bridge circuitry. By the distributed Wheatstone bridge circuitry one or more measurement channels defined by the torque sensor device of the at least one pair of torque sensor devices can reliably be sensed.

The Wheatstone bridge circuitry becomes unbalanced when a torque is applied and outputs a voltage (caused by the resistance change of the strain gages) proportional to the applied torque. Thus, the at least one torque sensor device 220, 230 of the system may comprise a bridge circuitry, for example, a Wheatstone bridge circuitry, electrically connected to the measurement transducers. The system 200 or at least one torque sensor device 220, 230 of the system may also comprise a DC or AC excitation source for the (for example, Wheatstone) bridge circuitry.

The two torque sensor devices 220 and 230 are arranged opposite to each other about an axial axis running through the center of the circular flange 200 in a direction perpendicular to the main surface of the circular 200. In principle, torque sensor devices such as the torque sensor devices 220 and 230 shown in FIG. 2 may be arranged pairwise symmetrically or asymmetrical about the axial axis running through the center of the circular flange 200 in a direction perpendicular to the main surface of the circular flange 200 and the torque sensor devices 220 and 230 define one or more measurement channels. In some embodiments, 100% redundancy of the torque measurement may be provided by providing two torque sensor devices 220, 230 on the flange 200 rather than providing only one of the torque sensor devices 220, 230 on the flange 200. In particular, pairs of torque sensor devices 220, 230 (and their respective measurement transducers) that are located opposite to each other may define one or more common measurement channels that may allow for torque measurements with higher accuracies as compared to measurements achieved by a single torques sensor device only.

By such a circular flange 200, a circular gear box of a robot joint can be sealed without the need for additional sealing devices, for example. Alternatively, the flange 200 has a different geometric shape symmetric about an axis extending perpendicular to the main surface of the flange through the center of the main surface, for example, an elliptical, or square, hexagonal or octagonal shape.

Figure 3B:
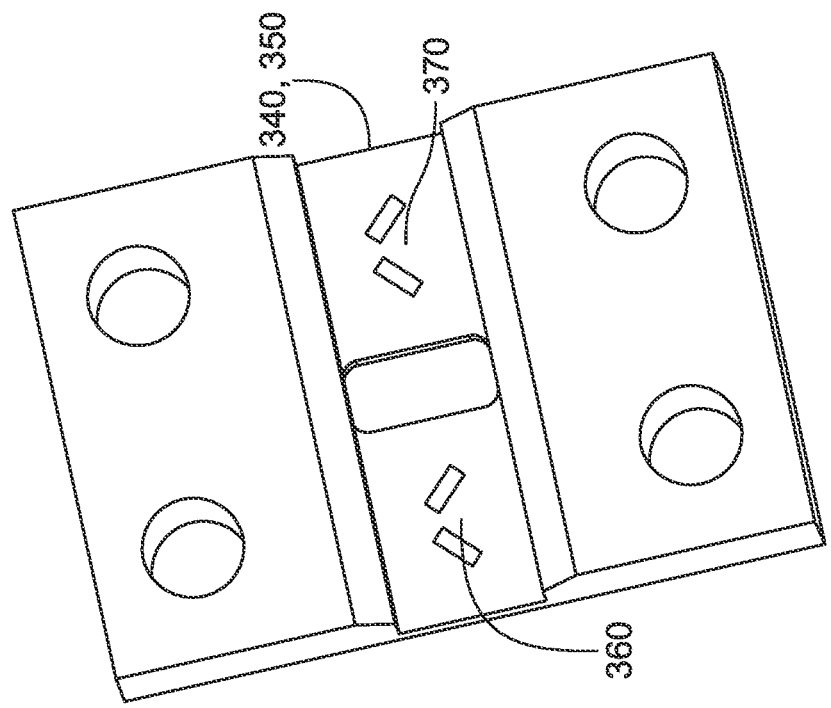
FIG. 3B is a perspective view of a sensing membrane of the torque sensor device of FIG. 3A.
Figure 3A:
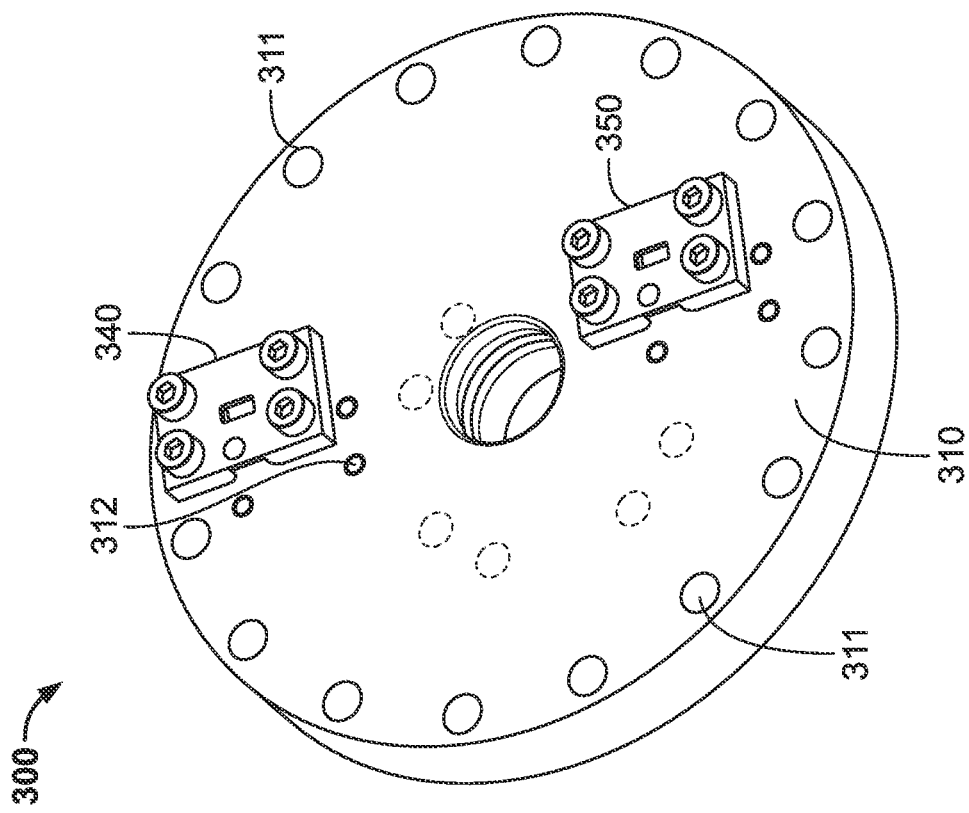
FIG. 3A is a perspective view of a torque sensor device comprised by the system shown in FIG. 2.

FIGS. 3A and 3B illustrates details of torque sensor devices of a system 300 for sensing torque, for example, the torque sensor devices 220 and 230 comprised by the system 200 shown in FIG. 2. The system 300 comprises a flange 310, for example, made of or comprising aluminum or an aluminum alloy. The flange 310 comprises outer force application openings 311 and inner force application openings 312. A first sensing membrane 340 of a first torque sensor device and a second sensing membrane 350 of a second torque sensor device are attached to the flange 310 (see FIG. 3A). The first sensing membrane 340 and the second sensing membrane 350 may consist of or comprise stainless steel.

On each of the sensing membranes 340, 350, measurement transducers 360, 370, for example, strain gages, are formed as it is illustrated in FIG. 3B. For example, two pairs of measurement transducers 360, 370 are provided wherein the individual transducers of each pair of measurement transducers 360, 370 define an angular range of 80° to 100°, for example about 90°. Each of the pairs of measurement transducers 360, 370 may define a measurement channel together with a respective other pair of measurement transducers (confer FIG. 2) comprised in another torque sensor device arranged on a flange 310 opposite to the one comprising the sensing membrane 340, 350 shown in FIG. 3B.

Figure 4:
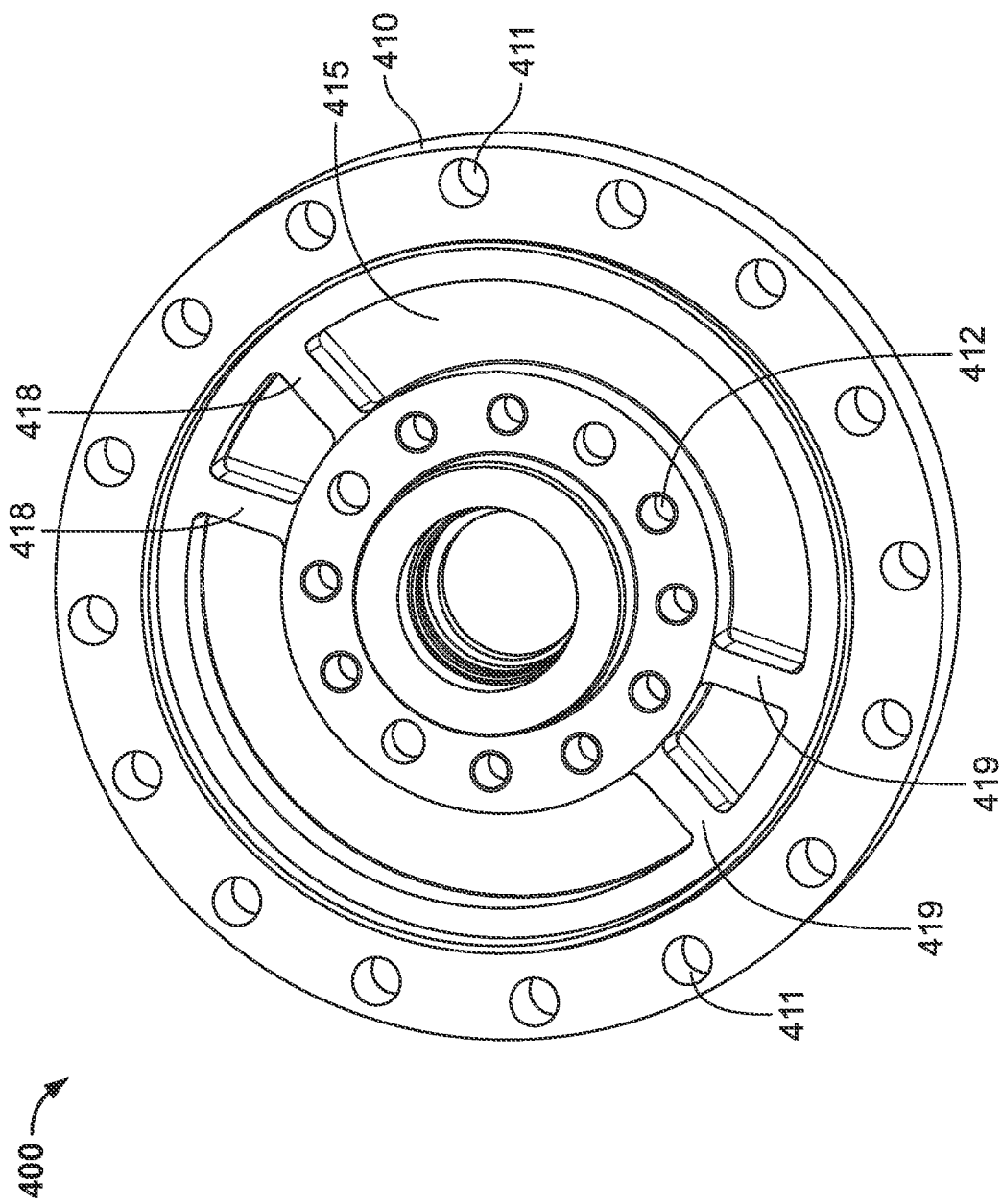
FIG. 4 is a perspective view of a flange of a system sensing torque according to an embodiment of the present invention.

FIG. 4 shows details of a flange of a system 400 for sensing torques, for example, the flange 210 shown in FIG. 2 or the flange 310 shown in FIG. 3A in a view from a direction opposite to the one shown in FIGS. 2 and 3A, respectively. The flange 410 is made of or comprises aluminum or an aluminum alloy, for example. The flange 410 comprises outer force application openings 411 and inner force application openings 412.

In some embodiments, a flange comprised in a system for sensing torque has a uniform thickness. However, the flange 410 shown in FIG. 4 has a weakened/thinned circular transducers area 415 over which measurement transducers, for example, strain gages, are formed. A transducers area of the flange 410 has a smaller thickness in a direction perpendicular to the main surface of the flange 410 than a thickness of at least a portion of the flange 410 in the direction perpendicular to the main surface of the flange 410 outside the (for example, symmetric as circular, elliptical, square etc., shaped) transducers area. The smaller thickness facilitates the transfer of externally applied torque to be measured to the measurement site(s), i.e., the location(s) of the torque sensor device(s).

Furthermore, a stiffening region comprising stiffening ribs (step portions) 418, 419 is provided in an area below the measurement transducers in order to enhance stiffness against cross loads. The stiffening ribs 418 and 419 may, respectively, define an angular range from 20° to 40° over which the measurement transducers are formed. The stiffening region (stiffening ribs 418, 419) may have a thickness in the range of 1.25 to 1.5 times the thickness of the circular transducers area 415.

The stiffening region may comprise a first portion radially extending (fully or partially) over the circular transducers area and a second portion radially extending (fully or partially) over the transducers area wherein the first and second portions define an angular range between about 30° to 90°, for example, 30° to 50°. The plurality of measurement transducers of the at least one torque sensor device is arranged over the thus defined angular range. This arrangement may be particular advantageous with respect to providing for a higher stiffness (insensitivity) against tilting moments and, consequently, may result in very accurate torque measurements.

The stiffening region (stiffening ribs 418, 419) may be made of the same material as the flange 410 and may be made integrally with the same. For example, torque measurement of robot joints/arms might be negatively affected by cross loads, particularly, when cross roll bearings are not provided for cost reasons. Provision of the stiffening region provides a high stiffness against cross and axial loads but does not influence significantly sensitivity regarding torque. The stiffening ribs 418, 419 may be formed in a u-shape or v-shape with sidewalls extending perpendicular or at some inclination angle from the main surface of the flange 410 in a direction opposite to the provided measurement transducers that are hidden by the flange 410 in the perspective view shown in FIG. 4. In an embodiment, the stiffening region may be continuously or discontinuously formed along a circular region within the circular transducers area.

Figure 5:
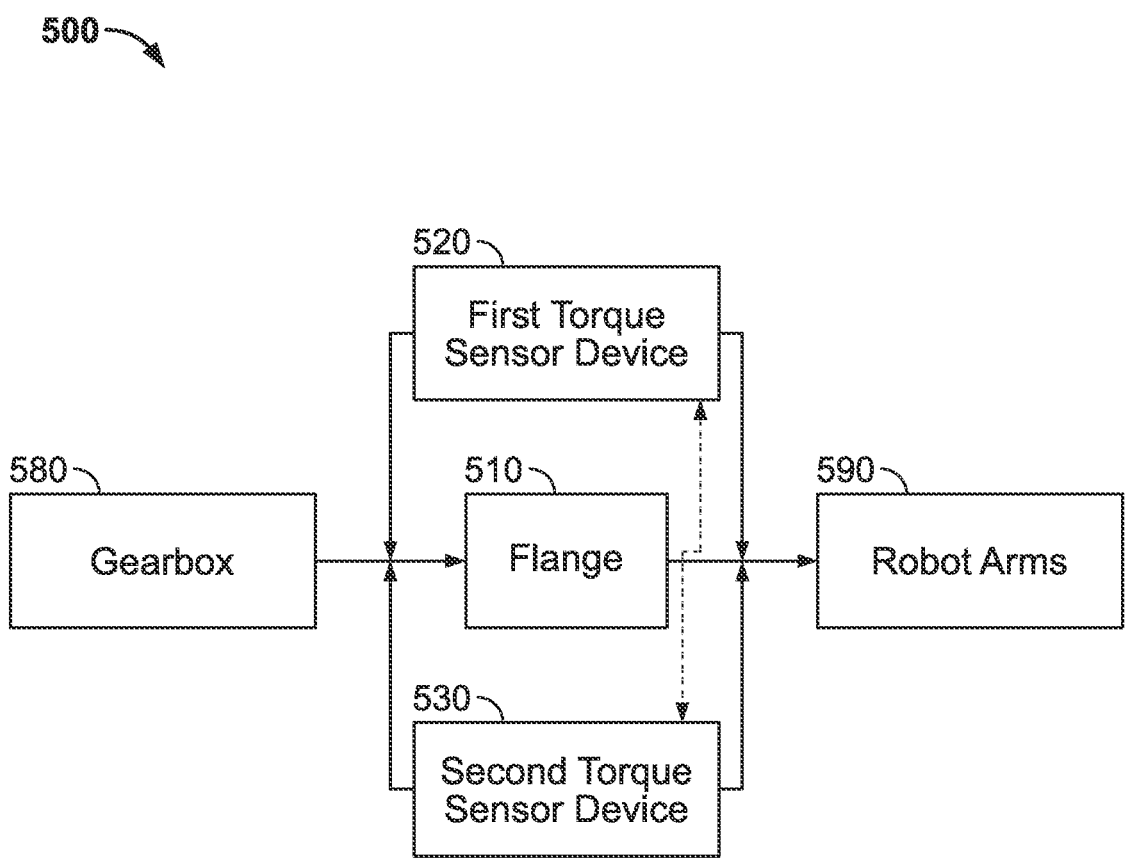
FIG. 5 is a block diagram of a system for sensing torque of a robot arm according to an embodiment of the present invention.

Application of a system 500 for sensing torque comprising a flange 510 and a first torque sensor device 520 as well as a second torque sensor device 530, for example, application of one of the systems 200, 300 and 400 shown in FIGS. 2, 3 and 4, respectively, is illustrated in FIG. 5. The system 500 is coupled to a gear box 580 of a joint of a robot, for example, a collaborative robot. The gear box 580 may be sealed by the flange 510 of the system 500. In an embodiment, the flange 510 may be attached to the joint and positioned to seal the gear box 580 of the joint of the robot.

By the system 500 torque of/applied to a robot arm 590 of the robot can be measured and the measurement can be used for controlling the operation of the gear in terms of torque control. The robot may not comprise any cross roller bearing, when the stiffening region described above reliably provides for sufficient stiffness against axial loads and tilting moments applied by the joint of the robot. Thus, costs can be reduced since no cross roller bearing might be necessary.

What is claimed is:
1. A system for sensing torque of an object, comprising:
    a flange having a first length along a main axis of a main surface of the flange; and a torque sensor device formed over an outermost surface of the main surface of the flange and including a sensing portion and a plurality of measurement transducers formed over the sensing portion, the torque sensor device has a second length parallel to the main surface of the flange and a third length parallel to the main surface of the flange, the second length and the third length are each smaller than half of the first length.

2. The system of claim 1, wherein the flange does not have a stainless steel material.

3. The system of claim 1, wherein the flange is formed of an isotropic material.

4. The system of claim 1, wherein the main surface of the flange has a symmetric shape.

5. The system of claim 1, wherein the main surface of the flange has a circular shape and the first length defines a diameter of the flange.

6. The system of claim 5, wherein a plurality of measurement transducers of the torque sensor device are arranged over a transducers area of the flange.

7. The system of claim 6, wherein the transducers area has a smaller thickness in a direction perpendicular to the main surface of the flange than a thickness of at least a portion of the flange outside the transducers area in the direction perpendicular to the main surface.

8. The system of claim 7, further comprising a stiffening region disposed in the transducers area.

9. The system of claim 8, wherein the stiffening region has a thickness in the direction perpendicular to the main surface of the flange larger than the thickness of the transducers area in the direction perpendicular to the main surface.

10. The system of claim 9, wherein the stiffening region has a u-shaped or v-shaped step portion having a plurality of sidewalls extending perpendicular or at an inclination angle from the main surface of the flange.

11. The system of claim 8, wherein the stiffening region includes a first portion radially extending over the transducers area and a second portion radially extending over the transducers area, the first portion and the second portion define an angular range of 30° to 90° and the plurality of measurement transducers of the torque sensor device are arranged over the angular range.

12. The system of claim 1, wherein the torque sensor device has at least two pairs of measurement transducers.

13. The system of claim 12, wherein each of the pairs of measurement transducers are arranged at an angle to each other that lies in a range of 80° to 100°.

14. The system of claim 1, wherein the torque sensor device is one of a pair of torque sensor devices formed over the main surface of the flange opposite to each other with respect to an axis extending through a center of the main surface of the flange and perpendicular to the main surface.

15. The system of claim 14, wherein the pair of torque sensor devices are positioned axially symmetrically to the axis extending through the center of the main surface of the flange and perpendicular to the main surface.

16. The system of claim 14, wherein one of the torque sensor devices has one half of a bridge circuitry and the other of the torque sensor devices has another half of the bridge circuitry.

17. The system of claim 16, wherein each half of the bridge circuitry is a Wheatstone bridge circuitry.

18. The system of claim 1, wherein the system is attached to a joint of a robot.

19. The system of claim 1, wherein the flange has a uniform thickness.

20. A robot, comprising:
a joint having a gear box; and
a system attached to the joint, the system including a flange having a first length along a main axis of a main surface of the flange and a torque sensor device formed over an outermost surface of the main surface of the flange, the torque sensor including a sensing portion and a plurality of measurement transducers formed over the sensing portion, the torque sensor device has a second length parallel to the main surface of the flange and a third length parallel to the main surface of the flange, the second length and the third length are each smaller than half of the first length.

21. The robot of claim 20, wherein the joint does not have a cross roller bearing.

22. A system for sensing torque of an object, comprising:
a flange having a first length along a main axis of a main surface of the flange; and
a torque sensor device formed over the main surface of the flange and including a sensing portion and a plurality of measurement transducers formed over the sensing portion, the torque sensor device has a second length parallel to the main surface of the flange and a third length parallel to the main surface of the flange, the second length and the third length are each smaller than half of the first length, the torque sensor device has at least two pairs of measurement transducers, each of the pairs of measurement transducers are arranged at an angle to each other that lies in a range of 80° to 100°.

23. A system for sensing torque of an object, comprising:
a flange having a first length along a main axis of a main surface of the flange; and
a pair of torque sensor devices each formed over the main surface of the flange, opposite to each other with respect to an axis extending through a center of the main surface of the flange, and perpendicular to the main surface, each torque sensor device includes a sensing portion and a plurality of measurement transducers formed over the sensing portion, each torque sensor device has a second length parallel to the main surface of the flange and a third length parallel to the main surface of the flange, the second length and the third length are each smaller than half of the first length.

* * * * *